(12) United States Patent
Mortemousque et al.

(10) Patent No.: US 12,450,515 B2
(45) Date of Patent: Oct. 21, 2025

(54) METHOD FOR READING THE SPIN STATE OF A SYSTEM AND ASSOCIATED METHOD FOR DETERMINING THE FIDELITY

(71) Applicants: COMMISSARIAT À L'ÉNERGIE ATOMIQUE ET AUX ÉNERGIES ALTERNATIVES, Paris (FR); CENTRE NATIONAL DE LA RECHERCHE SCIENTIFIQUE, Paris (FR)

(72) Inventors: Pierre-André Mortemousque, Grenoble (FR); Baptiste Jadot, Grenoble (FR); Tristan Meunier, Grenoble (FR); Matias Urdampilleta, Grenoble (FR)

(73) Assignees: COMMISSARIAT A L'ÉNERGIE ATOMIQUE ET AUX ÉNERGIES ALTERNATIVES, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 972 days.

(21) Appl. No.: 17/560,451

(22) Filed: Dec. 23, 2021

(65) Prior Publication Data
US 2022/0198314 A1    Jun. 23, 2022

(30) Foreign Application Priority Data
Dec. 23, 2020    (FR) ...................................... 2014084

(51) Int. Cl.
*G06N 10/60* (2022.01)
*G01N 24/00* (2006.01)
(52) U.S. Cl.
CPC ............. *G06N 10/60* (2022.01); *G01N 24/00* (2013.01)

(58) Field of Classification Search
None
See application file for complete search history.

(56) References Cited

U.S. PATENT DOCUMENTS 5,838,436 A * 11/1998 Hotaling ................ G06N 10/40
365/216
5,917,322 A *  6/1999 Gershenfeld ...... G01R 33/4625
324/307

(Continued)

FOREIGN PATENT DOCUMENTS

FR    3 066 297 A1    11/2018

OTHER PUBLICATIONS

NPL Albash Adiabatic Quantum Computing 2018.*
(Continued)

*Primary Examiner* — Paul M Knight
(74) *Attorney, Agent, or Firm* — Pillsbury Winthrop Shaw Pittman LLP

(57) ABSTRACT

A method of measuring the spin state of two charged particles able to adopt a first, second, third, and fourth spin state S, T+, T0 and T, the two charged particles being contained in a system, including first and second quantum dots characterised by a first parameter $\Gamma$ relative to the potential barrier separating the two quantum dots and a second parameter $\varepsilon$ corresponding to the difference in energy between the fundamental states of the first and second quantum dots, the couple formed by the values of these two parameters defining an operating point of the system as a function of which the system adopts a first charge state noted (1,1) wherein each quantum dot contains a charged particle, a second charge state noted (2,0) wherein the first quantum dot contains two charged particles or a third charge state noted (0,2) wherein the second quantum dot contains two charged particles.

9 Claims, 11 Drawing Sheets

(56) References Cited

U.S. PATENT DOCUMENTS

| | | | |
|---|---|---|---|
| 7,781,754 B2 | 8/2010 | Loss et al. | |
| 10,482,388 B1* | 11/2019 | Jock | H10D 62/83 |
| 10,607,993 B2 | 3/2020 | Hutin et al. | |
| 2004/0238813 A1* | 12/2004 | Lidar | G06N 10/20 |
| | | | 257/31 |
| 2006/0260016 A1* | 11/2006 | Greentree | G06N 10/40 |
| | | | 977/933 |
| 2012/0075682 A1* | 3/2012 | Amoroso | B82Y 10/00 |
| | | | 977/933 |
| 2022/0172097 A1* | 6/2022 | Langrock | G06N 10/70 |
| 2022/0351063 A1* | 11/2022 | Van Diepen | G01R 27/02 |
| 2022/0366290 A1* | 11/2022 | Simmons | G06N 10/20 |

OTHER PUBLICATIONS

NPL Bhaskaran Performance analysis of an interacting quantum dot 2012.*

NPL Flentje A linear triple quantum dot system in isolated configuration 2017.*

NPL Johnson Triplet singlet spin relaxation via nuclei in a double Q dot 2005.*

NPL Meunier Towards scalable quantum computing Inventor Pub 2019.*

NPL Mortemousque Coherent control of electron spins Inventor Pub 2018.*

NPL Mortemousque Enhanced Spin Coherence Inventor Pub 2021.*

NPL Nurizo Complete readout of two electron spin states Inventor Pub 2022.*

NPL Qiao Conditional teleportation of Qdot spin states Jun. 2020.*

NPL Urdampilleta Gate Based High Fidelity Spin Readout 2018.*

NPL Wagner Spin singlet spin triplet oscillations in Q dots 1992.*

Search Report as issued in French Patent Application No. 2014084, dated Oct. 29, 2021.

Urdampilleta, M., et al., "Gate-Based High Fidelity Spin Readout in a CMOS Device," Sep. 2018, 6 pages.

Nazarov, Y., et al., "Chapter 5: Quantum Transport: Introduction to Nanoscience," Cambridge: Cambridge University Press, (2009), pp. 445-456.

Hanson, R., et al., "Spins in few-electron quantum dots," Cornell University Library, Oct. 2006, 52 pages.

\* cited by examiner

[Fig. 1]
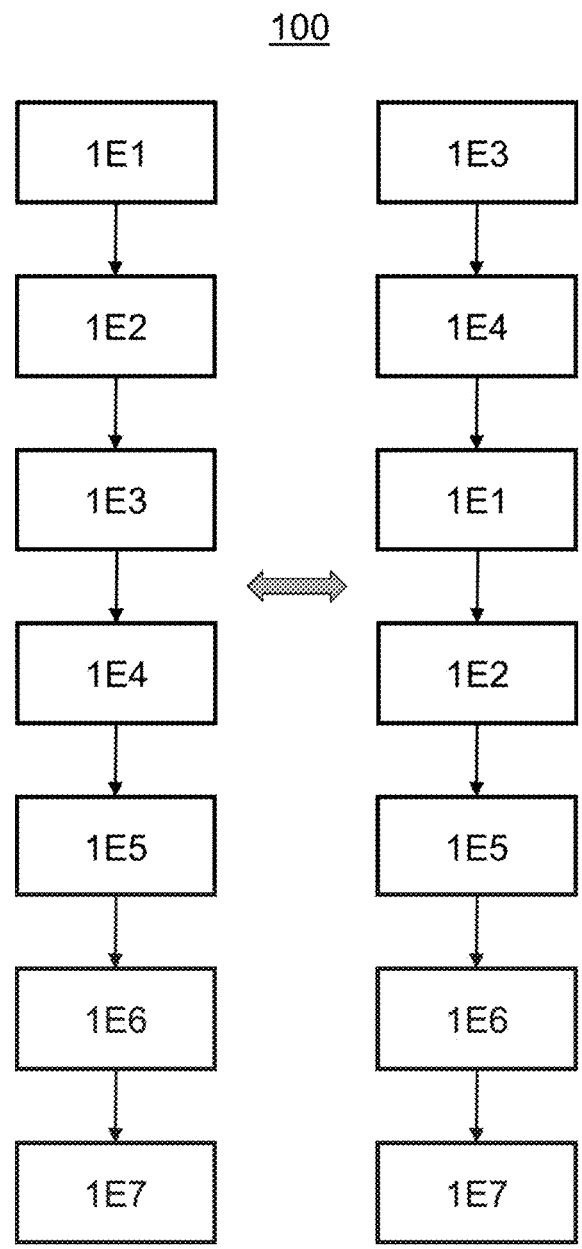

[Fig. 2]
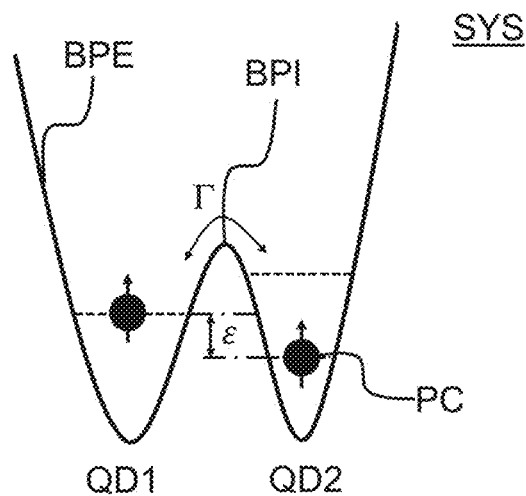
[Fig. 3]
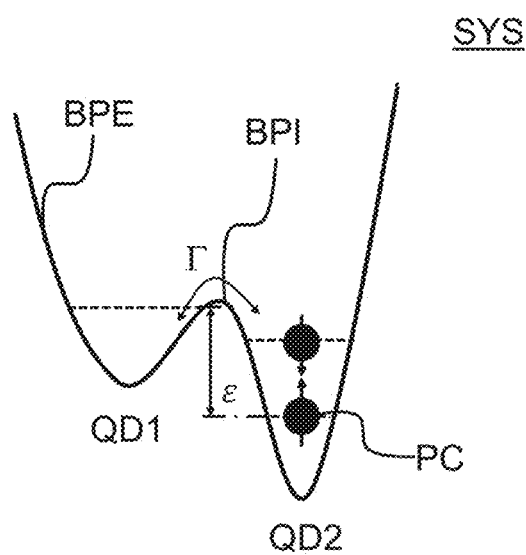

[Fig. 4]
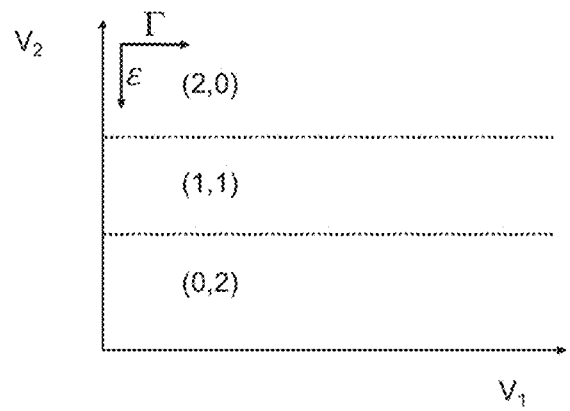
[Fig. 5]
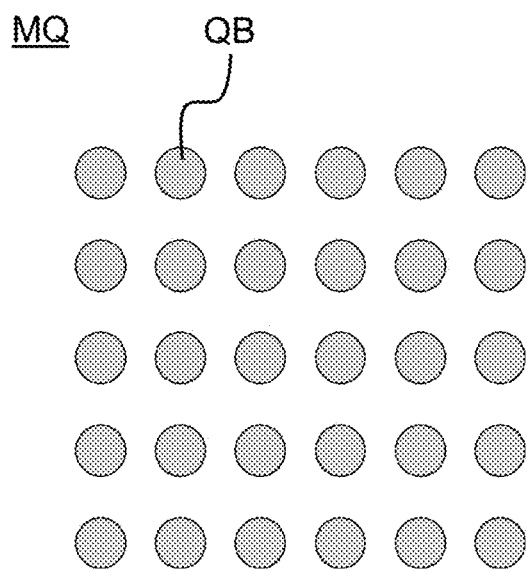
[Fig. 6]
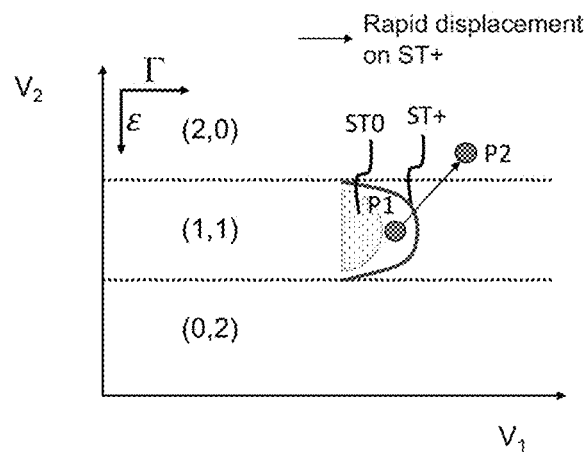

[Fig. 7]
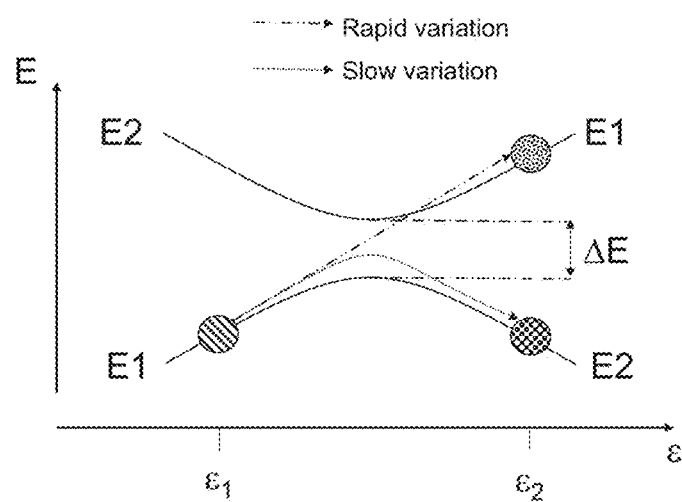

[Fig. 8]
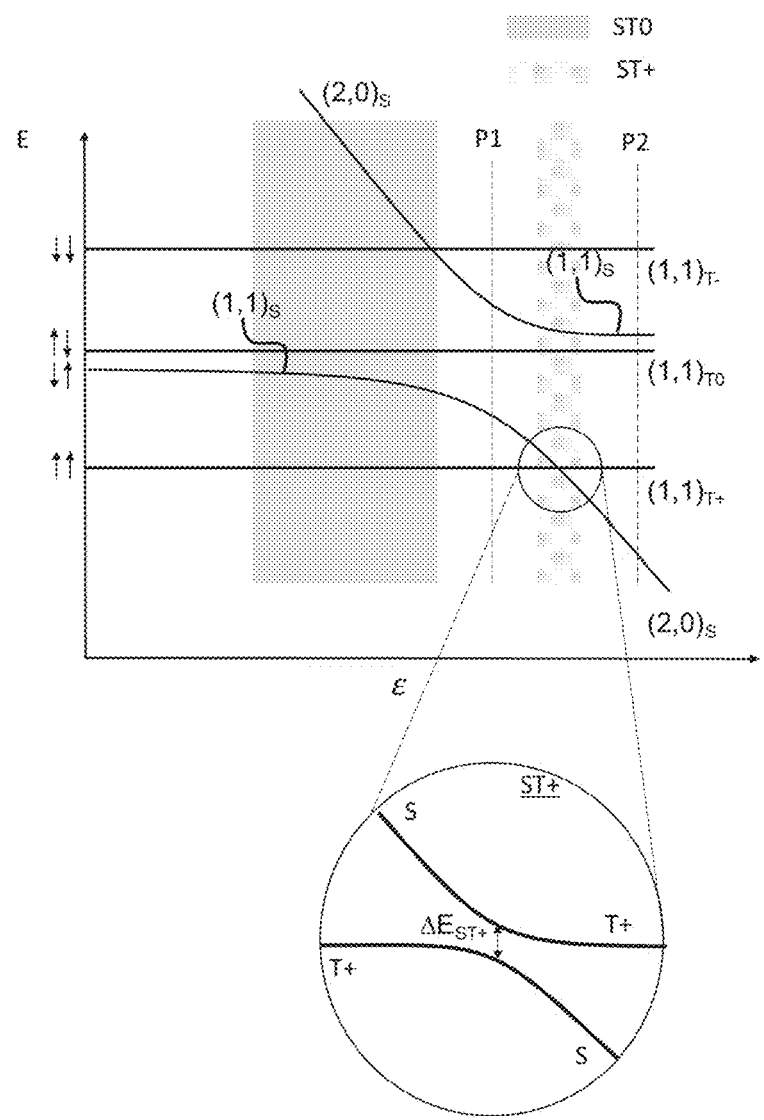

[Fig. 9]
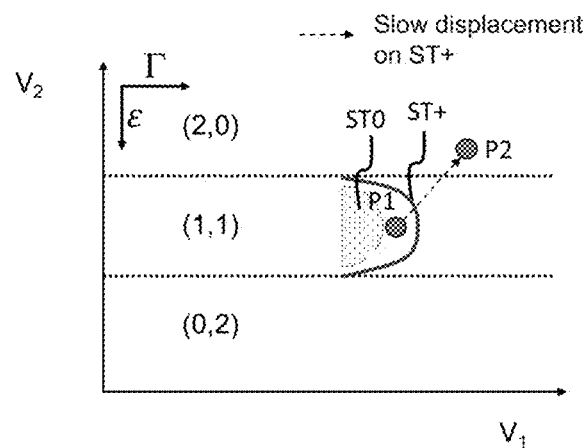
[Fig. 10]
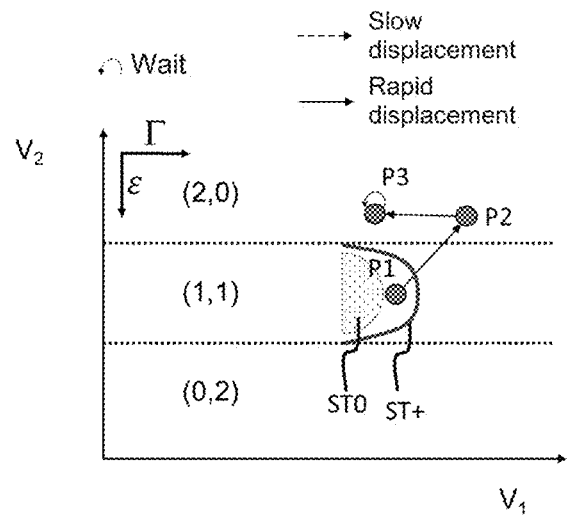

[Fig. 11]
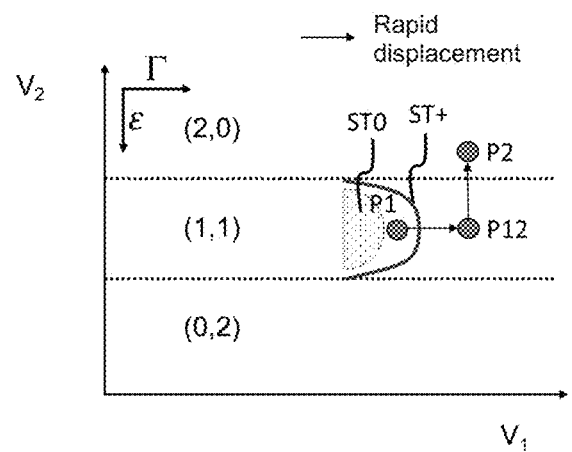
[Fig. 12]
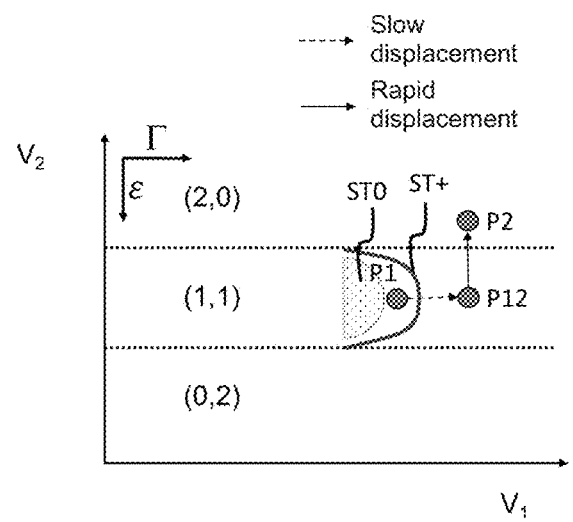

[Fig. 13]
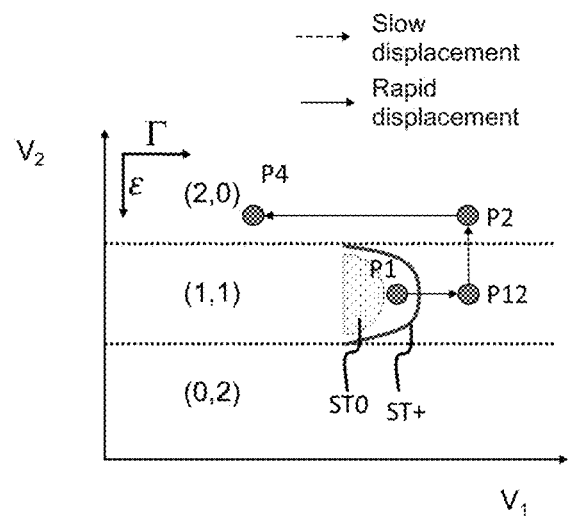
[Fig. 14]
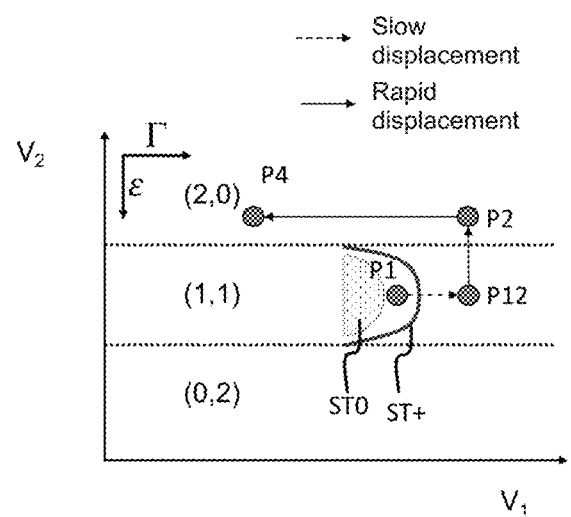

[Fig. 15]
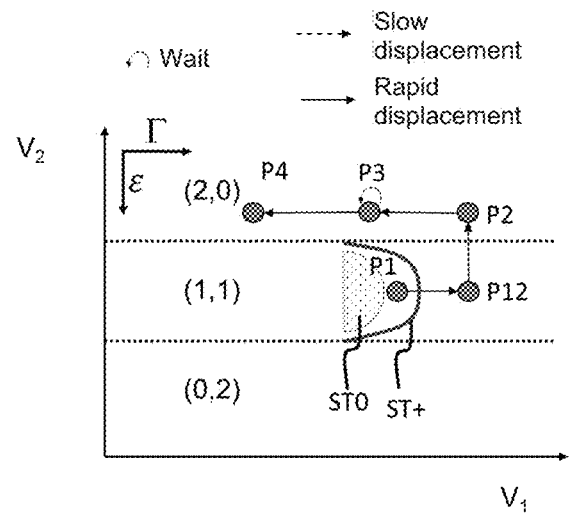
[Fig. 16]
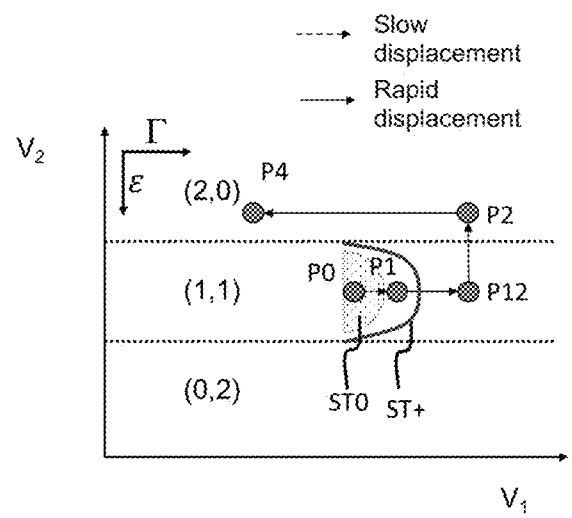

[Fig. 17]
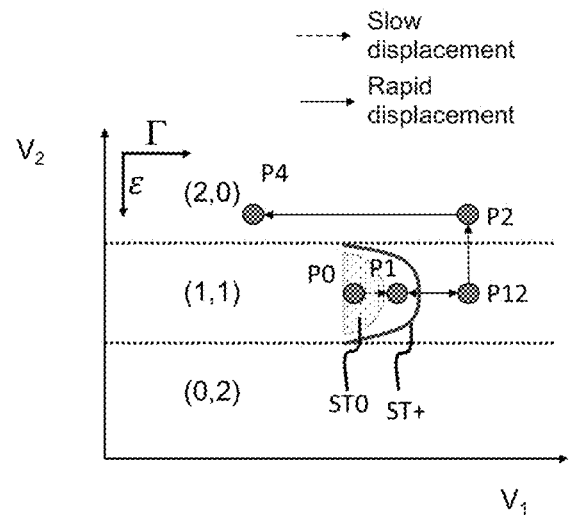
[Fig. 18]
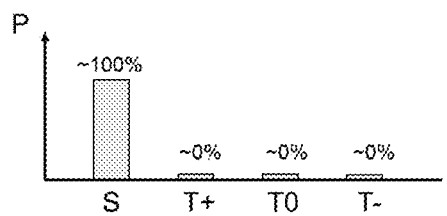
[Fig. 19]
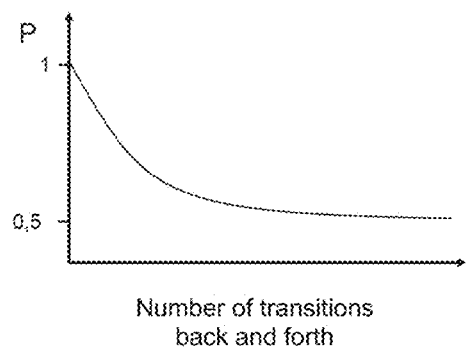

[Fig. 20]
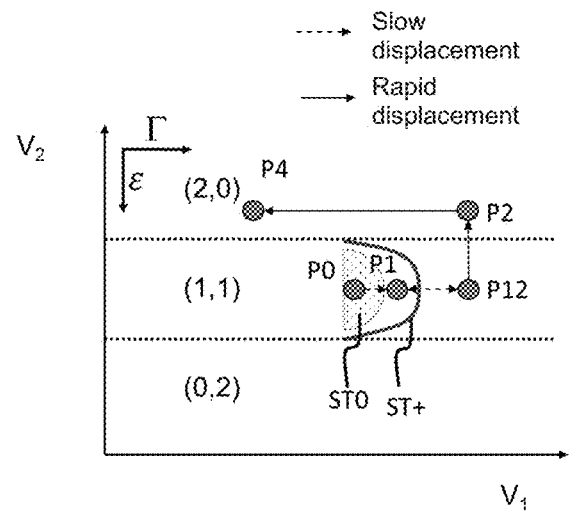
[Fig. 21]
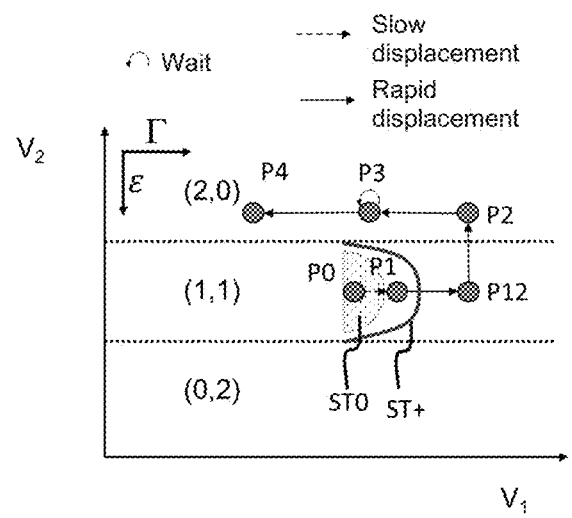

METHOD FOR READING THE SPIN STATE OF A SYSTEM AND ASSOCIATED METHOD FOR DETERMINING THE FIDELITY

CROSS-REFERENCE TO RELATED APPLICATIONS

This application claims priority to French Patent Application No. 2014084, filed Dec. 23, 2020, the entire content of which is incorporated herein by reference in its entirety.

FIELD

The technical field of the invention is that of quantum computing.

The present invention relates to a method for complete reading of the spin state of two charged particles contained in two coupled quantum dots, the charged particles being in an arbitrary spin state, and in particular a reading method which does not rely for the reading on charged particles contained in quantum dots external to the considered system of which the initial state is known. It also relates to a method making it possible to determine the fidelity of this reading.

BACKGROUND

When it is sought to determine the state of a spin qubit formed of a charged particle contained in a quantum dot, it is normal to have to resort to a second charged particle contained in a second quantum dot of which the spin state is known so as to implement a reading method in two steps: a first step of spin/charge conversion by the second quantum dot and a second step of reading the charge state of the second quantum dot.

Also, it appears from the preceding that it is not a priori possible to use the conventional principle of reading of the spin state of two charged particles without resorting to charged particles contained in quantum dots external to said system of which the initial spin state is known. However, such a solution has the major drawback of mobilising four quantum dots (or three quantum dots with a charge transfer) whereas only two of them (those of the system of which it will be sought to know the spin state) will be used for the realisation of quantum gates, the other two only serving to identify the spin state of the system once the quantum gates realised. In addition, it is necessary to know the spin state of the charged particles contained in these external quantum dots to perform this reading.

In addition, if it is sought to apply the same reading principle to a system with two charged particles contained in two coupled quantum dots and when it is wished to determine in a complete manner the state of said system using only quantum dots of the system, the following technical difficulty is encountered: the charge state of a quantum dot can only vary between two values whereas the spin state of the system can take four values. Also, it is not possible to "encode" in the charge state the four possible spin states of the system.

Also, there exists a need for a method for reading the complete spin state of a system with two charged particles contained in two coupled quantum dots not requiring the use of charged particles contained in quantum dots external to the considered system and of which the initial spin state is known.

SUMMARY

The invention offers a solution to the aforementioned problems, by making it possible, from the single system of charged particles contained in two coupled quantum dots, to determine the complete spin state of the considered system without a priori knowledge of this spin state, from the measurement of the charge state of the system.

To do so, a first aspect of the invention relates to a method for measuring the spin state of two charged particles being able to adopt a first spin state noted S, a second spin state noted T+, a third spin state noted T0 and a fourth spin state noted T−, the two charged particles being contained in a system, comprising a first quantum dot and a second quantum dot characterised by a first parameter $\Gamma$ relative to the potential barrier separating the two quantum dots and a second parameter $\varepsilon$ corresponding to the difference in energy between the fundamental state of the first quantum dot and the fundamental state of the second quantum dot, the couple formed by the values of these two parameters defining an operating point of the system as a function of which the system adopts a first charge state noted (1,1) wherein each quantum dot contains a charged particle, a second charge state noted (2,0) wherein the first quantum dot contains two charged particles or a third charge state noted (0,2) wherein the second quantum dot contains two charged particles, the operating point of the system being initially in a first operating point corresponding to the first charge state (1,1) of the system and for which the first S the second T+, the third T0 and the fourth T− spin states are eigenstates of the spin of the two charged particles, the method (100) comprising:

a first step of modification of the operating point of the system during which the operating point is displaced from the first operating point to a second operating point corresponding to the second charge state (2,0) or to the third charge state (0,2), the energy level of the first spin state S and the second spin state T+ forming an avoided crossing during the displacement from the first operating point to the second operating point, the modification of the operating point taking place non-adiabatically during the passage of the avoided crossing such that, during this step, the system transits from the first charge state (1,1) to the charge state corresponding to the second operating point when the two charged particles contained in the system are in the first spin state S and is maintained in the first charge state (1,1) for the other spin states;

a first step of measuring the charge state of the system, the spin state of the two charged particles at the first operating point being the first spin state S if the charge state of the system measured is equal to the charge state corresponding to the second operating point, the operating point being once again displaced to the first operating point;

a second step of modification of the operating point of the system during which the operating point is displaced from the first operating point to the second operating point, the modification of the operating point taking place adiabatically during the passage of the avoided crossing such that, during this step, the system transits from the first charge state (1,1) to the charge state corresponding to the second operating point when the two charged particles contained in the system are in the second spin state T+ and is maintained in the first charge state (1,1) for the other spin states;

a second step of measuring the charge state of the system, the spin state of the two charged particles at the first operating point being the second spin state T+ if the charge state of the system measured is equal to the charge state corresponding to the second operating point, the operating point being once again displaced to the first operating point;

a third step of modification of the operating point of the system during which the operating point is displaced from the first operating point to the second operating point, the modification of the operating point taking place non-adiabatically during the passage of the avoided crossing;

a waiting step at a waiting operating point corresponding to a charge state identical to that of the second operating point during a predefined time, step during which the system transits from the first charge state (1,1) to the charge state corresponding to the second operating point when the two charged particles are in the third spin state T0 and is maintained in the first charge state for the fourth spin state T−;

a third step of measuring the charge state of the system, the spin state of the two particles at the first operating point being the third spin state T0 if the charge state of the system measured is equal to the charge state corresponding to the second operating point and the fourth spin state T− if the charge state of the system measured is equal to the first charge state (1,1).

The notation adopted for the charge states should not be interpreted in a limiting manner, but has been chosen in order to make it easier to understand the invention. Thus, the charge state (1,1) should be understood as the charge state (n,n) where n is a number of charged particles for which the resulting spin is a spin ½. According to this same notation, the charge state (2,0) (respectively (0,2)) should be understood as the charge state (n+1,n−1) (respectively (n−1,n+1)). Thus, thanks to the method according to a first aspect of the invention, it is possible to determine the spin state of the system, that is to say the spin state of each qubit of the system, without resorting to one or more external qubits. It is notably beneficial when it is sought to maximise the number of qubits of a matrix of qubits used for the realisation of quantum gates since the same qubits may be used for the realisation of quantum gates and the reading of qubits. Further, the method according to the invention does not require any prior knowledge of the spin state, unlike methods of the prior art in which the spin state of the reading qubit must be known.

Apart from the characteristics that have been set out in the preceding paragraph, the method according to a first aspect of the invention may have one or more complementary characteristics among the following, considered individually or according to all technically possible combinations thereof.

In an embodiment, the waiting operating point is different from the second operating point, the method comprising, before the waiting step, a step of displacement of the operating point from the second operating point to the waiting operating point.

In an embodiment each step of modification of the operating point from the first operating point to the second operating point comprises:

a sub-step of modification from the first operating point to an intermediate operating point, the intermediate operating point corresponding to the first charge state of the system, the avoided crossing formed by the first spin state S and the second spin state T+ being crossed during this sub-step;

a sub-step of modification from the intermediate operating point to the second operating point, the modification taking place non-adiabatically during this sub-step.

In an embodiment, each step of measuring the charge state is preceded by a step of displacement of the operating point from the second operating point or from the waiting operating point to a fourth operating point corresponding to a charge state identical to the second operating point and having a value of the first parameter $\Gamma$ such that:

$$\Gamma \ll \frac{1}{\tau_{mes}}$$

where $\tau_{mes}$ is the time constant associated with the measurement of the charge state of the system.

A second aspect of the invention relates to a method for determining the fidelity of the measurement of a first spin state noted S of two charged particles being able to adopt said first spin state S, a second spin state noted T+, a third spin state noted T0 and a fourth spin state noted T−, the two charged particles being contained in a system, comprising a first quantum dot and a second quantum dot characterised by a first parameter $\Gamma$ relative to the potential barrier separating the two quantum dots and a second parameter $\varepsilon$ corresponding to the difference in energy between the fundamental state of the first quantum dot and the fundamental state of the second quantum dot, the couple formed by the values of these two parameters defining an operating point of the system as a function of which the system adopts a first charge state noted (1,1) wherein each quantum dot contains a charged particle, a second charge state noted (2,0) wherein the first quantum dot contains two charged particles or a third charge state noted (0,2) wherein the second quantum dot contains two charged particles, the operating point of the system being initially in a first operating point corresponding to the first charge state (1,1) of the system and for which the first S, the second T+, the third T0 and the fourth T− spin states are eigenstates of the spin of the two charged particles, the method comprising, for an initial population of spin states wherein the first spin state S is in the majority;

a step of modification of the operating point of the system during which the operating point is displaced from the first operating point to a second operating point corresponding to the second charge state (2,0) or to the third charge state (0,2), the energy level of the first spin state S and the second spin state T+ forming an avoided crossing during the displacement from the first operating point to the second operating point, the modification of the operating point comprising a predetermined number of non-adiabatic transitions back and forth on either side of the avoided crossing;

a step of measuring the charge state of the system;

the steps being repeated from the same population of spin states for a plurality of numbers of transitions back and forth, the fidelity being determined from the evolution of the probability of measurement of a charge state corresponding to the second operating point as a function of the number of transitions back and forth.

A third aspect of the invention relates to a method for determining the fidelity of the measurement of a second spin state noted T+ of two charged particles being able to adopt a first spin state S, the second spin state noted T+, a third spin state noted T0 and a fourth spin state noted T−, the two charged particles being contained in a system, comprising a first quantum dot and a second quantum dot characterised by a first parameter $\Gamma$ relative to the potential barrier separating the two quantum dots and a second parameter $\varepsilon$ corresponding to the difference in energy between the fundamental state of the first quantum dot and the fundamental state of the second quantum dot, the couple formed by the values of these two parameters defining an operating point of the system as a function of which the system adopts a first charge state noted (1,1) wherein each quantum dot contains a charged particle, a second charge state noted (2,0) wherein the first quantum dot contains two charged particles and a third charge state noted (0,2) wherein the second quantum dot contains two charged particles, the operating point of the system being initially in a first operating point corresponding to the first charge state (1,1) of the system and for which the first S, the second T+, the third T0 and the fourth T− spin states are eigenstates of the spin of the two charged particles, the method comprising, for an initial population of spin states wherein the second spin state T+ is in the majority:

- a step of modification of the operating point of the system during which the operating point is displaced from the first operating point to a second operating point corresponding to the second charge state (2,0) or to the third charge state (0,2), the energy level of the first spin state S and the second spin state T+ forming an avoided crossing during the displacement from the first operating point to the second operating point, the modification of the operating point comprising a predetermined number of adiabatic transitions back and forth on either side of the avoided crossing;
- a step of measuring the charge state of the system;
- the steps being repeated from the same population of spin states for a plurality of numbers of transitions back and forth, the fidelity being determined from the evolution of the probability of measurement of a charge state corresponding to the second operating point as a function of the number of transitions back and forth.

A fourth aspect of the invention relates to a method for determining the fidelity of the measurement of a third spin state noted T0 of two charged particles being able to adopt a first spin state S, a second spin state noted T+, the third spin state noted T0 and a fourth spin state noted T−, the two charged particles being contained in a system, comprising a first quantum dot and a second quantum dot characterised by a first parameter Γ relative to the potential barrier separating the two quantum dots and a second parameter ε corresponding to the difference in energy between the fundamental state of the first quantum dot and the fundamental state of the second quantum dot, the couple formed by the values of these two parameters defining an operating point of the system as a function of which the system adopts a first charge state noted (1,1) wherein each quantum dot contains a charged particle, a second charge state noted (2,0) wherein the first quantum dot contains two charged particles and a third charge state noted (0,2) wherein the second quantum dot contains two charged particles, the operating point of the system being initially in a first operating point corresponding to the first charge state (1,1) of the system and for which the first S, the second T+, the third T0 and the fourth T− spin states are eigenstates of the spin of the two charged particles, the method comprising, for an initial population of spin states wherein the third spin state T0 is in the majority:

- a step of modification of the operating point of the system during which the operating point is displaced from the first operating point to a second operating point corresponding to the second charge state (2,0) or to the third charge state (0,2), the energy level of the first spin state S and the second spin state T+ forming an avoided crossing during the displacement from the first operating point to the second operating point, the modification of the operating point taking place non-adiabatically during the passage of the avoided crossing;
- a waiting step at a waiting operating point corresponding to a charge state identical to that of the second operating point during a predefined time;
- a step of measuring the charge state of the system;
- the steps being repeated from the same population of spin states for a plurality of predefined waiting times, the fidelity being determined from the evolution of the probability of measurement of a charge state corresponding to the second operating point as a function of the waiting times.

A fifth aspect of the invention relates to a quantum device comprising at least two qubits, an in an embodiment a matrix MQ of qubits, and a system configured to implement a method according to a first, a second, a third or a fourth aspect of the invention.

A sixth aspect of the invention relates to a computer programme comprising instructions which, when the programme is executed by a computer, lead it to implement the method according to a first, a second, a third or a fourth aspect of the invention.

A seventh aspect of the invention relates to a non-transitory computer readable data support or computer readable medium, on which is recorded the computer programme including instructions according to a sixth aspect of the invention.

The invention and the applications thereof will be better understood on reading the description that follows and by examining the figures that accompany it.

BRIEF DESCRIPTION OF THE FIGURES

The figures are presented for indicative purposes and in no way limit the invention.

FIG. 1 shows a flow chart of a method according to a first aspect of the invention.

FIG. 2 shows a schematic representation of a system according to the invention in a first charge state.

FIG. 3 shows a schematic representation of a system according to the invention in a third charge state.

FIG. 4 shows a schematic representation of a stability diagram.

FIG. 5 shows a matrix of quantum dots capable of being used for the implementation of the invention.

FIG. 6 shows the position of the first operating point and the second operating point in the stability diagram as well as the zones relative to different properties of the spin states of the charged particles.

FIG. 7 illustrates the principle of the Landau-Zener formula for the avoided crossings.

FIG. 8 shows the evolution of the energy of the spin states of the charged particles as a function of the second parameter ε of the system according to the invention.

FIG. 9 to FIG. 16 illustrate certain embodiments of a method according to a first aspect of the invention.

FIG. 17 illustrates an embodiment of a method according to a second aspect of the invention.

FIG. 18 shows a schematic representation of a population of spin states.

FIG. 19 shows a schematic representation of the probability of measuring a given charge state as a function of the number of transitions back and forth at the level of the avoided crossing.

FIG. 20 illustrates an embodiment of a method according to a third aspect of the invention.

FIG. 21 illustrates an embodiment of a method according to a fourth aspect of the invention.

DETAILED DESCRIPTION

The figures are presented for indicative purposes and in no way limit the invention.
Method for Measuring the Spin State of Two Charged Particles A first aspect of the invention illustrated in FIG. 1, in FIG. 2 and in FIG. 3 relates to a method 100 for measuring the spin state of two charged particles PC carrying a spin, for example two electrons or instead two holes. The two charged particles PC can adopt a first spin state noted S (singlet), a second spin state noted T+, a third spin state noted T0 and a fourth spin state noted T− (these three states being known by the name of triplet and are differentiated from each other by the z component of their magnetic moment).

In the method 100 according to the invention, the two charged particles PC are contained in a system SYS, comprising a first quantum dot QD1 and a second quantum dot QD2. Such a system SYS is illustrated in FIG. 2 and in FIG. 3, and is characterised by a first parameter $\Gamma$ relative to the potential barrier BPI separating the two quantum dots QD1, QD2 and a second parameter $\varepsilon$ corresponding to the difference in energy between the fundamental state of the first quantum dot QD1 and the fundamental state of the second quantum dot QD2. Furthermore, the two quantum dots QD1, QD2 of the system SYS are separated from potential adjacent quantum dots by a second potential barrier BPE, for example when the two quantum dots QD1, QD2 belong to a matrix MQ of quantum dots QD (cf. FIG. 5 described hereafter). In this embodiment, the parameter $\Gamma$ is such that:

$$\Gamma \ll \frac{1}{\tau_{poc}}$$

where $\tau_{proc}$ is the time necessary for the implementation of a method according to the invention, for example:

$$\Gamma < \frac{1}{100 \times \tau_{poc}}$$

The couple formed by the values of the first parameter $\Gamma$ and the second parameter $\varepsilon$ define an operating point of the system SYS as a function of which the system SYS can adopt a first charge state noted (1,1) wherein each quantum dot QD1, QD2 contains a charged particle PC (cf. FIG. 2), a second charge state noted (2,0) wherein the first quantum dot QD1 contains two charged particles PC and a third charge state noted (0,2) wherein the second quantum dot QD2 contains two charged particles PC (cf. FIG. 3). Hereafter, displacement of operating point will signify the fact of modifying the value of the first parameter $\Gamma$ and/or the second parameter $\varepsilon$.

Indeed, such an operating point may be represented in a stability diagram such as illustrated in FIG. 4 and a modification of the first parameter $\Gamma$ and/or the second parameter $\varepsilon$ corresponds to a displacement in this diagram. In this stability diagram, the first parameter $\Gamma$ may be modified using a first voltage V1 whereas the second parameter $\varepsilon$ may be modified using a voltage V2. Obtaining such a stability diagram is known to those skilled in the art and thus will not be detailed here. It is to be noted that the stability diagram of FIG. 4 has been simplified for illustrative purposes, but that experimentally, the two parameters generally depend on the first voltage V1 and on the second voltage V2. In addition, in this simplified representation of a stability diagram, two operating points having the same X-axis are relative to a same potential barrier between the two quantum dots QD1, QD2 of the system (and thus the same value of the first parameter $\Gamma$), whereas two operating points having the same Y-axis are relative to a same value of the second parameter of $\varepsilon$.

As already mentioned, a system SYS according to the invention may for example be formed on a matrix MQ of quantum dots QD such as illustrated in FIG. 5. In this figure, each grey circle illustrates a quantum dot QD of the matrix MQ which can, by means of gates (not represented), be controlled so as to be able to couple together or conversely to be isolated from adjacent quantum dots QD, Such a matrix MQ of quantum dots QD is for example illustrated in FIGS. 1 and 3 of the document FR 3066297 A1, which corresponds to U.S. Pat. No. 10,607,993 issued on Mar. 31, 2020 and which is herein incorporated by reference in its entirety.

As illustrated in FIG. 6, in the method 100 according to the invention, the operating point of the system SYS is initially in a first operating point P1 corresponding to the first charge state (1,1) of the system SYS and for which the first S, second T+, third T0 and fourth T− spin states are eigenstates of the spin of the two charged particles PC. It will be noted that the first operating point P1 is still situated between the region ST0 (this region generally being used during the manipulation of the charged particles PC contained in the system SYS) and the region ST+ (these two regions, known in the field, will be detailed hereafter) and it is separated from the second operating point P2 (also detailed hereafter) by the region ST+.
First Spin State S or Other Spin States T+, T0, T−

As illustrated in FIG. 6, the method 100 according to the invention comprises a first step 1E1 of modification of the operating point of the system during which the operating point is displaced from the first operating point P1 to a second operating point P2 corresponding to the second charge state (2,0) or to the third charge state (0,2). In the example of FIG. 6 (and in the remainder of the text), the second operating point P2 corresponds to the second charge state (2,0). Furthermore, the energy level of the first spin state S and the second spin state T+ forms an avoided crossing during the displacement from the first operating point P1 to the second operating point P2. A region corresponding to this avoided crossing, known in the field by the name of region ST+, is represented in the stability diagram of FIG. 6.

An avoided crossing (or anticrossing) is illustrated in FIG. 7 which shows the energy diagram of a first state E1 and a second state E2 as a function of the second parameter $\varepsilon$. For the value $\varepsilon_1$ of the parameter $\varepsilon$, the fundamental state is E1 whereas for the value $\varepsilon_2$ of this parameter, the fundamental state is E2. In other words, the variation in the value of the parameter $\varepsilon$ from the value $\varepsilon_1$ to the value $\varepsilon_2$ corresponds to a transition from the fundamental state of the system from the state E1 to the state E2. By starting from the state E1 and by varying the value of the parameter $\varepsilon$ from the value $\varepsilon_1$ to the value $\varepsilon_2$, the final state of the system depends on the speed of this variation. The behaviour of such a system on an avoided crossing is known and formalised by the Landau-Zener formula.

If the variation occurs rapidly, then the final state is identical to the initial state, that is to say that, in the example of FIG. 7, the state E1 is unchanged. On the other hand, if the variation is slow, then for an initial state E1, the final state is the state E2. The notion of rapid or slow is a function of the minimum energy difference ΔE between the two states E1, E2 of the system and may be determined using the Landau-Zener formula. Hereafter, slow variation or adiabatic variation is taken to mean a variation that corresponds to a probability $P_{\varepsilon1 \to \varepsilon2} \geq 0.99$, in an embodiment $P_{E1 \to E2} \geq 0.999$. In the same way, rapid variation or non-adiabatic variation is taken to mean a variation that corresponds to a probability $P_{E1 \to E2} \leq 0.01$, in an embodiment $P_{E1 \to E2} \leq 0.001$.

At the first operating point P1, the first spin state S corresponds to the state E2 of FIG. 7 and the second spin state T+ corresponds to the state E1 of the same figure. In addition, at the operating point P1, these two spin states correspond to the first charge state (1,1). On the other hand, at the operating point P2, the first spin state S corresponds to the charge state relative to the second operating point P2 (that is to say the second charge state (2,0) or the third charge state (0,2)) whereas the second spin state T+ corresponds to the first charge state (1,1) (this is furthermore true for the three triplet states T+, T0, T− and not only for the second spin state T+). This difference in charge is explained by Pauli blocking which, when the two charged particles PC are in a triplet spin state, prohibits the latter from being in the same quantum dot QD1, QD2.

Yet, during the first step 1E1 of modification of the operating point, the modification of the operating point takes place rapidly during the passage of the avoided crossing ST+. In other words, the system SYS maintains its spin state. In particular, if the charged particles PC are in a first spin state S at the first operating point P1 then they will also be in a first spin state S at the second operating point P2. However, as already mentioned, at the first operating point P1, the first spin state S corresponds to the first charge state (1,1) whereas at the second operating point the first spin state S corresponds to the charge state relative to said operating point (that is to say to the second charge state (2,0) or to the third charge state (0,2)). Also, during the first step 1E1 of modification of the operating point, the system SYS transits from the first charge state (1,1) to the charge state corresponding to the second operating point P2 when the two charged particles PC contained in the system SYS are in the first spin state S at the first operating point P1. There is thus spin/charge conversion during this step when the spin state of the charged particles PC at the first operating point P1 is the first spin state S.

For similar reasons, if the charged particles PC are in the second spin state T+ at the first operating point P1, then they will also be at the second spin state T+ at the second operating point P2. In addition, as mentioned previously, the charge state corresponding to the second spin state T+ is the first charge state (1, 1). Also, no change of charge state is observed during this step 1E1 in this case.

In order to illustrate the evolution of the third spin state T0 and the fourth spin state T− during the first step 1E1 of modification of the operating point, an energy diagram of the different spin states of the two charged particles PC is illustrated in FIG. 8, In this diagram is represented the energy of the four spin states as a function of the second parameter ε as well as the charge state that is associated therewith (it is assumed here that the second operating point P2 corresponds to the second charge state (2,0)). A schematic position of the first operating point P1 and the second operating point P2 also figure on this diagram to make it easier to understand. The diagram also represents the aforementioned region ST0. Further, the avoided crossing and the region ST+ that is associated therewith are also represented, the difference in energy at the level of the avoided crossing being noted $\Delta E_{ST+}$. It is thus with respect to this energy difference that the notions of rapid modification and slow modification are determined. It is useful to note that a similar diagram may be represented as a function of the first parameter Γ, but that the reading of the diagram thus obtained is more complex and thus has not been chosen here. Those in the field will understand however that the teachings that it is possible to extract from the diagram of FIG. 8 are identical to those that it is possible to extract from the same diagram as a function of the first parameter Γ or instead a combined variation of two parameters Γ and ε. It is also useful to note that such a diagram is known to those in the field as shown for example in FIG. 5.22 of chapter 5 of the work of Nazarov, Y., & Blanter, Y. (2009); Quantum Transport: Introduction to Nanoscience; Cambridge: Cambridge University Press cited in the introduction. The invention thus resides in the clever use of the physical properties of a system SYS according to the invention represented by this diagram.

This energy diagram makes it possible to note that, during the first step 1E1 of modification of the operating point, if the charged particles PC are in a third spin state T0 or a fourth spin state T− at the first operating point P1, their spin state is not modified and no change of charge state is observed.

Also, during the first step 1E1 of modification of the operating point, the system SYS is maintained in the first charge state (1,1) for the other spin states, that is to say when the charged particles are in a second T+, third T0 or fourth T− spin state.

In order to be able to determine whether there has been a change in the charge state of the system SYS or not, the method 100 according to the invention comprises a first step 1E2 of measuring the charge state of the system SYS, for example using an electrometer, the spin state of the two charged particles PC being the first spin state S if the charge state of the measured system is equal to the charge state corresponding to the second operating point P2. It is useful to note here that the absence of change of charge state of the system SYS during this step 1E2 makes it possible to deduce that the spin state of the charged particles PC is not the first spin state S, but does not make it possible to deduce this spin state, the latter being able to be the second spin state T+, the third spin state T0 or the fourth spin state T−.

Also, in the absence of change of charge state, it is necessary to continue the method 100 and the operating point is thus once again displaced to the first operating point P1 in order to continue the method 100. This displacement is in an embodiment carried out rapidly by the shortest path in the stability diagram at the operating point at which is carried out the measurement of the charge state and the first operating point P1.

Second Spin State T+ or Other Spin States S, T0, T−

As illustrated in FIG. 9, the method 100 according to the invention also comprises a second step 1E3 of modification of the operating point of the system SYS during which the operating point is displaced from the first operating point P1 to the second operating point P2, the modification of the operating point taking place slowly during the passage of the avoided crossing such that, during this step, the system SYS transits from the first charge state (1,1) to the charge state corresponding to the second operating point P2 when the two charged particles PC contained in the system SYS are in the second spin state T+ and is maintained in the first charge state (1,1) for the other spin states.

As mentioned previously, at the operating point P1, the first spin state S corresponds to the state E2 of FIG. 7 and the second spin state T+ corresponds to the state E1 of the same figure. In addition, at the operating point P1, these two spin states correspond to the first charge state (1,1). On the other hand, at the operating point P2, the first spin state S corresponds to the charge state relative to the second operating point P2 (that is to say the second charge state (2,0) or the third charge state (0,2)) whereas the second spin state T+ corresponds to the first charge state (1,1).

Yet during the second step 1E3 of modification of the operating point, the modification of the operating point takes place slowly during the passage of the avoided crossing ST+. In other words, if the charged particles PC are in the first spin state S at the first operating point P1, then they will be in the second spin state T+ at the second operating point P2. Similarly, if the charged particles PC are in the second spin state T+ at the first operating point P1, then they will be in the first spin state S at the second operating point. However, as already mentioned, at the first operating point P1, the second spin state T+ corresponds to the first charge state (1,1) whereas at the second operating point the first spin state S corresponds to the charge state relative to said operating point (that is to say to the second charge state (2,0) or to the third charge state (0,2)). Also, during the second step 1E3 of modification of the operating point, the system SYS transits from the first charge state (1,1) to the charge state corresponding to the second operating point P2 when the two charged particles PC contained in the system SYS are in the second spin state T+ at the first operating point P1. There is thus spin/charge conversion during this step when the spin state of the charged particles PC at the first operating point P1 is the second spin state T+.

For similar reasons, if the charged particles PC are in the first spin state S at the first operating point, then they will be in the second spin state T+ at the second operating point P2. In addition, as mentioned previously, the charge state corresponding to the first spin state S at the first operating point P1 is the first charge state (1,1) and the charge state corresponding to the second spin state T+ at the second operating point P2 is also the first charge state (1,1). Also, no change of charge state is observed during this step 1E3 in this case.

As previously, the energy diagram of FIG. 8 makes it possible to note that, during the second step 1E3 of modification of the operating point, if the charged particles PC are in a third spin state T0 or a fourth spin state T− at the first operating point P1, their spin state is not modified and no change of charge state is observed.

Also, during the second step 1E3 of modification of the operating point, the system SYS is maintained in the first charge state (1,1) for the other spin states, that is to say when the charged particles PC are in a first S, third T0 or fourth T− spin state.

In order to be able to determine whether there has been a change of the charge state of the system SYS or not, the method 100 according to the invention comprises a second step 1E4 of measuring the charge state of the system SYS, the spin state of the two charged particles PC being the second spin state T+ if the charge state of the system measured is equal to the charge state corresponding to the second operating point P2. It is useful to note here that the absence of change of charge state of the system SYS during this step makes it possible to deduce that the spin state of the charged particles PC is not the second spin state T+, but does not make it possible to deduce this spin state, the latter being able to be the first spin state S, the third spin state T0 and the fourth spin state T−.

Also, in the absence of change of charge state, it is necessary to continue the method 100 and the operating point is thus once again displaced to the first operating point P1 in order to continue the method 100. As previously, this displacement is in an embodiment carried out rapidly by the shortest path in the stability diagram in the operating point at which is carried out the measurement of the charge state and the first operating point P1.

Chronologies of the First and Second Steps of Modification of the Operating Point It appears from what precedes that the second step 1E3 of modification of the operating point may be carried out before or after the first step 1E1 of modification of the operating point and that, thus, the two flow charts of FIG. 1 are two alternative embodiments of the method 100 according to the invention. It will be appreciated that steps 1E2, 1E4 of measuring the charge state must consequently be permuted.

Third Spin State T+ or Fourth Spin State T−

It is interesting to note that at this stage of the method 100, the first spin state S and the second spin state T+ have been eliminated from the possible spin states, the latter not having been detected during the implementation of the aforementioned steps 1E1-1E4.

At the end of steps 1E1-1E4 that have just been described, as illustrated in FIG. 10, the method 100 according to the invention next comprises a third step 1E5 of modification of the operating point of the system during which the operating point is displaced from the first operating point P1 to the second operating point P2, the modification of the operating point taking place rapidly during the passage of the avoided crossing.

It thus involves a displacement identical to that carried out during the first step 1E1 of the operating point. Yet, it has been seen that, during this step 1E5, if the charged particles PC are in the third spin state T0 at the first operating point P1, then they are also in the third spin state T0 at the second operating point P2. Similarly, during this step 1E5, if the charged particles PC are in the fourth spin state T− at the first operating point P1, then they are also in the fourth spin state T− at the second operating point P2. In both cases, no change of the charge state of the system SYS is thus observed.

The method 100 according to the invention next comprises a step 1E6 of waiting at a waiting operating point P3 corresponding to a charge state identical to that of the second operating point P2 during a predefined time. The waiting operating point P3 may be identical to the second operating point P2 or different from the latter (this aspect will be detailed hereafter), but corresponds to a same charge state as the latter. When the waiting operating point P3 is different from the second operating point P2, then the value of the first parameter Γ associated with the waiting operating point P3 is less than the value of said parameter associated with the second operating point P2.

During this waiting time, interactions of the charged particles PC with phonons are liable to lead to relaxation from a starting spin state to a second spin state of lower energy, here the first spin state S (cf. FIG. 8). In addition, it is known to persons in the field that this relaxation is generally at least 100 times faster for a transition from the third spin state T0 to the first spin state S ($\Delta m_z=0$) than for transitions from T+ or T−. Yet, the transition from the third spin state T0 to the first spin state S also leads to a change in the charge state of the system SYS. Also, during this step, due to relaxation induced by phonons, the system SYS transits from the first charge state (1,1) to the charge state corresponding to the second waiting operating point (and identical to the charge state corresponding to the second operating point P2) when the two charged particles PC are in the third spin state T0 and is maintained in the first charge state for the fourth spin state T−. There is thus spin/charge conversion during this step when the spin state of the charged particles PC at the first operating point P1 is the third spin state T0.

In the example of FIG. 10, the waiting operating point P3 is different from the second operating point P2. Also, in this embodiment, the waiting step 1E6 is preceded by a step of displacement of the operating point from the second operating point P2 to the waiting operating point P3.

In an embodiment, the speed of modification of the operating point from the operating point P2 to the operating point P3 is chosen such that the time necessary to bring the system from the second operating point P2 to the operating point P4 at which the measurement of the charge state takes place is much less (for example at least one hundred times less) than the relaxation time between the spin state T0 corresponding to the first charge state (1,1) and the spin state S corresponding to the second (2,0) or to the third (0,2) charge state. It is in this sense that the displacement may be qualified as rapid in this case.

In an embodiment, the operating point P3 is chosen close to an operating point wherein the first spin state S corresponding to the charge state (1,1) and the third spin state T0 corresponding to the charge state (1,1) are quasi-degenerated so as to be dominated by the difference in Zeeman energy between the two quantum dots dEz and to favour interaction with phonons. For example, the point P3 is chosen such that:

$$\frac{(ET0(1,1)_{P3} - ES(1,1)_{P3}) - dEz}{dEz} < 0.01$$

Where dEz is the difference in Zeeman energy between the two quantum dots, $ET0(1,1)_{P3}$ is the energy associated with the spin state T0 at the operating point P3 and $ES(1,1)_{P3}$ is the energy associated with the spin state S at the operating point P3.

Use of an Intermediate Operating Point

In an embodiment illustrated in FIG. 11 (in the case of a rapid displacement) and in FIG. 12 (in the case of a slow displacement), each step of modification of the operating point from the first operating point P1 to the second operating point P2 comprises:
- a sub-step of modification from the first operating point P1 to an intermediate operating point P12, the intermediate operating point P12 corresponding to the first charge state of the system, the avoided crossing formed by the first spin state S and the second spin state T+ being crossed during this sub-step (while respecting the speed of modification of the step of modification of the operating point concerned);
- a sub-step of displacement from the intermediate operating point P12 to the second operating point P2, the displacement taking place rapidly during this sub-step.

In an embodiment, during the first sub-step, the modification of the operating point only concerns the value of the first parameter Γ. Similarly, in an embodiment, during the second sub-step, the modification of the operating point only concerns the value of the second parameter ε.

Reading Operating Point P4

In order to increase the reliability of the measurement of the charge state, it is necessary to carry out this measurement for an operating point for which the coupling between the first quantum dot QD1 and the second quantum dot QD2 is lower than the time for measuring the charge state such that the charge state does not vary during the measurement. In other words, for a measurement time $\tau_{mes}$, then the first parameter Γ must be such that:

$$\Gamma \ll \frac{1}{\tau_{mes}}$$

For example:

$$\Gamma < \frac{1}{100 \times \tau_{mes}}$$

Also, in this embodiment, each step of measuring the charge state is preceded by a step of rapid modification of the operating point from the second operating point P2 or from the waiting operating point P3 to a fourth operating point P4 corresponding to a charge state identical to the second operating point P2 and having a value of the first parameter τ such that:

$$\Gamma \ll \frac{1}{\tau_{mes}}$$

where $\tau_{mes}$ is the time constant associated with the measurement of the charge state of the system.

In an embodiment, the speed of modification of the operating point from the operating point P2 to the operating point P4 is chosen such that the time necessary to bring the system from the second operating point P2 to the fourth operating point P4 is much less (for example at least one hundred times less) than the relaxation time between the spin state T0 corresponding to the first charge state (1,1) and the spin state S corresponding to the second (2,0) or to the third (0,2) charge state. It is in this sense that the displacement may be qualified as rapid in this case.

An exemplary embodiment of this embodiment combined with the embodiment relative to the intermediate operating point P12 is illustrated in FIG. 13, in FIG. 14 and in FIG. 15:
- in FIG. 13 for the sequence comprising a rapid displacement at the level of the avoided crossing ST+ without waiting time;
- in FIG. 14 for the sequence comprising a slow displacement at the level of the avoided crossing ST+ without waiting time;
- in FIG. 15 for the sequence comprising a rapid displacement at the level of the avoided crossing ST+ with a waiting time at the waiting operating point P3 (here different from the second operating point P2).

Initial Position of the Operating Point

Generally, the determination of the spin state of the charged particles PC is carried out after a manipulation step. Yet, this manipulation step generally takes place while the operating point is in the region ST0 corresponding to the first charge state (1,1).

Also, in an embodiment, the method comprises a preliminary step of adiabatic modification of the operating point from a manipulation position point P0, where the system is dominated by the Zeeman energies associated with two charged particles each in a quantum dot (with for base eigenenergy levels (u,u), (d,d), (u,d) and (d,u) where u signifies up and d signifies down) at the first operating point P1 (with for base eigenenergy levels S, T0, T+, T−). The notion of adiabatic modification is here relative to the difference in energy between the spin state S associated with the charge state (1,1) and the spin state T0 associated with the charge state (1,1), this difference being a function of the difference in magnetic field between the two quantum dots QD1, QD2.

It will be appreciated that since it involves a preliminary step, the latter is implemented before the first step 1E1 of modification or the second step 1E3 of modification of the point if the latter is carried out before the first step 1E1 of modification. Such a step is illustrated in FIG. 16 in the embodiment where the latter is followed by the first step 1E1 of modification of the operating point (that is to say with a rapid modification of the operating point).

Conditions for Stopping the Method.

It is possible to adopt two conditions for stopping the method according to the invention. In one embodiment, all of the steps are implemented even when a change of the charge state is detected in the course of the method. This embodiment has the benefit of not requiring rapid feedback and makes it possible to detect certain errors in the measurement of the spin state. In an alternative embodiment, the method is stopped when a change of the charge state is detected. This embodiment makes it possible to gain measurement speed, only the necessary steps being implemented.

Determination of the Fidelity of the Measurement of the First Spin State S

It may be interesting to evaluate the fidelity of the method 100 that has just been described. In order to determine this fidelity for the measurement of the first spin state S, a second aspect of the invention illustrated in FIG. 17 relates to a method for determining the fidelity of the measurement of the first spin state S. In order to measure this fidelity, the method is implemented from an initial population of spin states (cf. FIG. 18) wherein the first spin state S is in the majority (that is to say above 50%, in an embodiment above 90%—in the example of FIG. 18, this proportion is close to 100%).

Generally speaking, in order to obtain this population, a spin state is prepared while the system is in an initial operating point P0 for which the first quantum dot QD1 is decoupled from the second quantum dot QD2, for example in the region ST0 already described. Then, the operating point is modified slowly from this initial operating point P0 to the first operating point P1, This procedure is repeated after each step of measurement 1E2 of the spin state so as to implement the method for the desired spin population.

From the population thus obtained, the method according to a second aspect of the invention comprises a step of modification of the operating point of the system SYS during which the operating point is displaced from the first operating point P1 to a second operating point P2 corresponding to the second charge state (2,0) or to the third charge state (0,2), the energy level of the first spin state S and the second spin state T+ forming an avoided crossing during the displacement from the first operating point P1 to the second operating point P2, the modification of the operating point comprising a predetermined number of rapid transitions back and forth on either side of the avoided crossing. It thus involves here repeating a plurality of times the spin/charge conversation operated during the first step 1E1 of modification of the operating point of the method 100 according to a first aspect of the invention.

In the example of FIG. 17, the step of modification of the operating point of the system SYS comprises a first sub-step of rapid modification of the operating point during which transitions back and forth take place between the first operating point P1 and an intermediate operating point P12, the intermediate operating point P12 corresponding to the first charge state of the system SYS, the avoided crossing ST+ formed by the first spin state S and the second spin state T+ being crossed during each transition back and forth.

The step of modification of the operating point next comprises a sub-step of modification from the intermediate operating point P12 to the second operating point P2, the modification taking place rapidly during this sub-step.

The method next comprises a step of measuring the charge state of the system SYS, the spin state of the two charged particles PC at the first operating point P1 being the first spin state S if the charge state of the system SYS measured is equal to the charge state corresponding to the second operating point P2. In an embodiment, this measurement step takes place at the reading operating point P4 described previously.

The fidelity of the measurement may next be deduced from the evolution of the probability of measuring the charge state corresponding to the second operating point P2 as a function of the number of transitions back and forth. Such an evolution is illustrated in FIG. 19.

Determination of the Fidelity of the Measurement of the Second Spin State T+

It is also possible to determine the fidelity of the measurement of the second spin state T+. To do so, as illustrated in FIG. 20, the method for determining the measurement of the first spin state that has been described is implemented with the following modifications: the second spin state T+ is in the majority in the initial population and the transitions back and forth take place slowly. The other elements of the method are identical.

The fidelity of the measurement may next be deduced from the evolution of the probability of measuring the second spin state T+(that is to say to measure a change of the charge state) as a function of the number of transitions back and forth. Such an evolution is similar to that illustrated in FIG. 19 for the first spin state.

Determination of the Fidelity of the Measurement of the Third Spin State T0

It is finally possible of determine the fidelity of the measurement of the third spin state T0. In order to determine this fidelity for the measurement of the first spin state S, a fourth aspect of the invention illustrated in FIG. 21 relates to a method for determining the fidelity of the measurement of the third spin state T0. In order to measure this fidelity, the method is implemented from an initial population of spin states wherein the third spin state T0 is in the majority (that is to say above 50%, in an embodiment above 90%).

The method firstly comprises a step of modification of the operating point of the system during which the operating point is displaced from the first operating point P1 to a second operating point P2 corresponding to the second charge state (2,0) or to the third charge state (0,2), the energy level of the first spin state S and the second spin state T+ forming an avoided crossing during the displacement from the first operating point P1 to the second operating point (P2), the modification of the operating point taking place rapidly during the passage of the avoided crossing. As for the methods described previously, this modification may be carried out by passing through an intermediate operating point P12 (cf. FIG. 21).

The method next comprises a waiting step at a waiting operating point P3 corresponding to a charge state identical to that of the second operating point P2 during a predefined time. When the waiting operating point P3 is different from the second operating point P2, then the value of the first parameter Γ associated with the waiting operating point P3 is less than the value of said parameter Γ associated with the second operating point P2. In an embodiment, the operating point P3 is chosen close to an operating point wherein the state S associated with the charge state (1,1) and the state T0 associated with the charge state (1,1) are quasi-degenerated so as to be dominated by the difference in Zeeman energy between the two quantum dots dEz and to favour interaction with phonons. For example, the point P3 is chosen such that:

$$\frac{(ET0(1,1)_{P3} - ES(1,1)_{P3}) - dEz}{dEz} < 0.01$$

Where dEz is the difference in Zeeman energy between the two quantum dots, $ET0(1,1)_{P3}$ is the energy associated with the spin state T0 at the operating point P3 and $ES(1,1)_{P3}$ is the energy associated with the spin state S at the operating point P3.

The method next comprises a step of measuring the charge state of the system SYS. In an embodiment, this measurement step takes place at the reading operating point P4 described previously.

The steps are repeated from the same population of spin states for a plurality of predefined waiting times, the fidelity being determined from the evolution of the probability of measurement of a charge state corresponding to the second operating point P2 as a function of the waiting time. It is interesting to note that this procedure of measuring the fidelity may be used to determine the waiting time making it possible to obtain the best fidelity and thus that which it is appropriate to use in the method 100 according to a first aspect of the invention.

Device According to the Invention

In order to implement a method according to a first, second, third or fourth aspect of the invention, a fifth aspect of the invention relates to a device comprising at least two dots QD1, QD2, and in an embodiment a matrix MQ of quantum dots QD and a system configured to implement a method according to a first, second, third or fourth aspect of the invention. Such a device capable of being configured to implement the invention is for example described in the document FR 3066297 A1, which corresponds to U.S. Pat. No. 10,607,993 issued on Mar. 31, 2020 and which is herein incorporated by reference in its entirety.

For example, the device for measuring the spin state of the two particles includes at least two quantum dots (and, in an embodiment, a matrix of quantum dots), a reservoir to put charges in the quantum dots, gates to manipulate the quantum dots and the coupling between themselves and a reservoir, and one or measurement devices (for example including an electrometer, which can be implemented with a quantum point contact) in order to determine the charge state of the quantum dots. For example, an electrometer can be used to measure the charge state of one or more quantum dots. U.S. Pat. No. 10,607,993 describes an example of such a device. The voltages applied to the gates are modified through the device to change the operating point of the system (V1 and V2 on the figures—which are simplified illustrations that neglect cross-talk between gates).

An embodiment of the quantum device with spin qubits, comprises at least: a first semiconducting layer comprising a first matrix of data qubits and measurement qubits connected to each other through tunnel barriers; a system of addressing data qubits and measurement qubits configured for controlling conduction of each tunnel barrier by the field effect and comprising at least: first and second electrically conducting portions arranged in first and second superposed metallization levels respectively; first and second electrically conducting vias each comprising a first end connected to one of the first and second electrically conducting portions respectively, and a second end located facing one of the tunnel barriers; a first dielectric layer interposed between the tunnel barriers and the second ends of the first and second electrically conducting vias.

Therefore, in this device, to address data qubits and measurement qubits with electrostatic gates formed by electrically conducting vias positioned facing tunnel barriers connecting the qubits, rather than using electrical connections connected to these qubits directly. These electrically conducting vias are polarised by means of conducting portions of metallization levels. Each conducting via forms an electrostatic control gate of one of the tunnel barriers connecting the qubits together. These control gates are arranged in a matrix.

An individual qubit can be controlled from row and column addressing of tunnel barriers (for example two, three or four depending on the position of the addressed qubit within the matrix) connected to this qubit and controlled by electrostatic gates formed facing these tunnel barriers.

It is possible that in optimization modes, electrostatic potentials of tunnel barriers of qubits adjacent to the addressed qubit can also be controlled because the control of electrostatic potentials of tunnel barriers connected to the addressed qubit is can impact adjacent qubits connected to these tunnel barriers. However, when a qubit is addressed, this qubit is connected to a larger number of tunnel barriers for which the electrostatic potentials are controlled than adjacent qubits due to the row and column addressing made.

With such addressing system, it is possible to make individual addressing of each data or measurement qubit using only two metallization levels, regardless of the size of the qubits matrix and the number of qubits included in this matrix.

The tunnel barriers can be formed from narrower semiconductor portions than those forming the qubits. Such narrower semiconductor portions are called "constrictions".

Each data qubit can be connected to at least two adjacent measurement qubits and each measurement qubit can be connected to at least two adjacent data qubits.

The quantum device may be such that: in the first matrix, the data qubits and the measurement qubits are aligned in first and second directions perpendicular to each other forming rows and columns of the first matrix; the second ends of the first electrically conducting vias are arranged facing some of the tunnel barriers called the first tunnel barriers, each connecting one of the data qubits and one of the adjacent measurement qubits and located on the same row of the first matrix; the second ends of the second electrically conducting vias are arranged facing some of the other tunnel barriers called the second tunnel barriers, each connecting one of the data qubits and one of the adjacent measurement qubits and located on the same column of the first matrix.

Each of the first electrically conducting portions may be connected to the first ends of the first conducting vias, the seconds ends of which are facing the first tunnel barriers connecting the data qubits and the measurement qubits located on two adjacent columns of the first matrix, and each of the second electrically conducting portions may be connected to the first ends of the second conductor vias, the second ends of which are facing the second tunnel barriers connecting the data qubits and the measurement qubits located on two adjacent rows of the first matrix.

The quantum device may also comprise a second semiconducting layer comprising a second charge detectors matrix, for example with each comprising one quantum dot, each of the measurement qubits possibly being electrically connected to one of the charge detectors through a first semiconducting portion extending between the first and second semiconducting layers, each of the first semiconducting portions possibly being coupled to at least one gate configured for controlling tunnel coupling between the charge detector and the measurement qubit connected through said first semiconducting portion. In this case, each of the first gates controls electrical conduction within one of the first semiconducting portions each of which connects one of the measurement qubits to one of the charge detectors. In this configuration, the semiconducting level in which charge detectors are made is not the same as the level in which the data qubits and the measurement qubits are located. Such a configuration solves density problems when making qubits encountered in structures according to prior art, and therefore can be used to make small data qubits and measurements qubits (for example the spacing between two adjacent qubits being between about 5 nm and 100 nm, and the lateral dimensions, for example the diameter, of each qubit being between about 5 nm and 100 nm). Constraints relate to making the second matrix of charge detectors are also reduced.

Furthermore, each of the first semiconducting portions may be coupled to a first and to a second gate configured for controlling tunnel coupling between the charge detector and the measurement qubit connected through said first semiconducting portion and that are distinct and at a distance from each other, and the quantum device may also include: third electrically conducting portions each connected to first gates located around first semiconducting portions connected at least to measurement qubits located on the same column of the first matrix; fourth electrically conducting portions each connected to second gates located around first semiconducting portions connected at least to measurement qubits located on the same row of the first matrix.

The first and second gates may be coating and each may be located around one of the first semiconducting portions.

In a second embodiment, the quantum device may also comprise a second semiconducting layer and a second charge detectors matrix formed from second semiconducting portions extending between the first and second semiconducting layers, each of the second semiconducting portions possibly being connected by at least one third tunnel barrier to at least one of the measurement qubits located in the plane of the first semiconducting layer, around said second semiconducting portion.

Unlike an embodiment in which the charge conductors are fabricated within the second semiconducting layer and in which the first semiconducting portions connect these charge detectors at least to the measurement qubits, in another embodiment, a system of fabricating charge detectors using the second semiconducting portions that extend between the first and the second semiconducting layers. In this second embodiment, the charge detectors are not addressed through the first and second gates formed around the first semiconducting portions, instead they are addressed by data qubit and measurement qubit addressing device that also act on conduction of the third tunnel barriers that connect the charge detectors to at least the measurement qubits. The benefit of this embodiment is that there is no need to make coating gates between two semiconducting layers.

According to a beneficial configuration of this other embodiment, each of the second semiconducting portions may be connected by at least two third tunnel barriers to at least two measurement qubits located in the plane of the first semiconducting layer around said second semiconducting portion. The quantum device according to this configuration has the benefit that it reduces the number of charge detectors used by putting charge detectors in common for at least several measurement qubits.

Beneficially, each data qubit may be connected to one of the charge detectors.

In this case, in the first embodiment, each data qubit may be electrically connected to one of the charge detectors through one of the first semiconducting portions that can be coupled to at least one gate configured for controlling tunnel coupling between the charge detector and the data qubit connected through said first semiconducting portion. Furthermore, as for the first semiconducting portions connecting charge detectors to the measurement qubits, each of the first semiconducting portions connecting the charge connectors to the data qubits may be coupled to a first and to a second gate configured for controlling tunnel coupling between the charge detector and the data qubit connected through the first semiconducting portion and that are distinct and at a distance from each other, and in this case with: third electrically conducting portions each connected to first gates located around first semiconducting portions connected at the data qubits located on the same column of the first matrix; fourth electrically conducting portions each connected to second gates located around first semiconducting portions connected to data qubits located on the same row of the first matrix.

For these first semiconducting portions connecting charge detectors to data qubits, it is possible that the first and second gates are coating and each is located around one of these first semiconducting portions.

In the second embodiment, when each of the data qubits is connected to one of the charge detectors, each of said second semiconducting portions may be connected by at least one third tunnel barrier to at least one of the measurement or data qubits located in the plane of the first semiconducting layer, around said second semiconducting portion. Furthermore, each of the second semiconducting portions may be connected by four third tunnel barriers to at least two measurement qubits and two data qubits located in the plane of the first semiconducting layer around the second semiconducting portion.

The first semiconducting layer may be located between the second semiconducting layer and the first and second metallization levels.

The second semiconducting layer may also comprise doped portions configured for forming charge carrier reservoirs to which the charge detectors are connected by means of fourth tunnel barriers.

According to a beneficial configuration, each of the doped portions may be connected to several charge detectors arranged on a same row or a same column of the second matrix. Putting doped portions in common at several charge detectors is advantageous because there is no need to make an individual control of the fourth tunnel barriers.

The quantum device may also comprise second gates configured for controlling conduction of each of the fourth tunnel barriers by the field effect. The second gates may be formed by fifth electrically conducting portions extending parallel to the rows or columns of the first matrix, arranged facing the fourth tunnel barriers and spaced from the fourth tunnel barriers by a second dielectric layer. Furthermore, the fifth electrically conducting portions may be formed in a conducting level such that the second semiconducting layer is located between the first semiconducting layer and the conducting level.

Each of the fifth electrically conducting portions may form several second gates.

Various embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium (e.g. a memory) is not a propagated signal, a computer storage medium can be a source or destination of computer program instructions encoded in an artificially-generated propagated signal. The computer storage medium also can be; or can be included in, one or more separate physical components or media (e.g., multiple CDs; disks, or other storage devices). When applicable, some of the operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable processor; digital signal processor (DSP), a computer, a system on a chip, or multiple ones, or combinations, of the foregoing. The apparatus can include special purpose logic circuitry, e.g., an FPGA (field programmable gate array) or an ASIC (application-specific integrated circuit).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors; and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic; magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention claimed is:

1. A method for measuring a spin state of two charged particles being able to adopt a first spin state noted S, a second spin state noted T+, a third spin state noted T0 and a fourth spin state noted T−, the two charged particles being contained in a system, comprising a first quantum dot and a second quantum dot characterised by a first parameter Γ relative to a potential barrier separating the first and second quantum dots and a second parameter ε corresponding to a difference in energy between a fundamental state of the first quantum dot and a fundamental state of the second quantum dot, a couple formed by values of the first and second parameters defining an operating point of the system as a function of which the system adopts a first charge state noted (1,1) wherein each quantum dot contains a charged particle, a second charge state noted (2,0) wherein the first quantum dot contains two charged particles or a third charge state noted (0,2) wherein the second quantum dot contains two charged particles, the operating point of the system being initially in a first operating point corresponding to the first charge state (1,1) of the system and for which the first S, the second T+, the third T0 and the fourth T− spin states are eigenstates of the spin of the two charged particles, the method comprising:

a first step of modification of the operating point of the system during which the operating point is displaced from the first operating point to a second operating point corresponding to the second charge state (2,0) or to the third charge state (0,2), the energy level of the first spin state S and the second spin state T+ forming an avoided crossing during the displacement from the first operating point to the second operating point, the modification of the operating point taking place non-adiabatically during a passage of the avoided crossing such that, during said first step, the system transits from the first charge state (1,1) to the charge state corresponding to the second operating point when the two charged particles contained in the system are in the first spin state S and the system is maintained in the first charge state (1,1) for the other spin states;
a first step of measuring the charge state of the system, the spin state of the two charged particles at the first operating point being the first spin state S if the charge state of the system measured is equal to the charge state corresponding to the second operating point, the operating point being once again displaced to the first operating point;
a second step of modification of the operating point of the system during which the operating point is displaced from the first operating point to the second operating point, the modification of the operating point taking place adiabatically during the passage of the avoided crossing such that, during said second step, the system transits from the first charge state (1,1) to the charge state corresponding to the second operating point when the two charged particles contained in the system are in the second spin state T+ and is maintained in the first charge state (1,1) for the other spin states;
a second step of measuring the charge state of the system, the spin state of the two charged particles at the first operating point being the second spin state T+ if the charge state of the system measured is equal to the charge state corresponding to the second operating point, the operating point being once again displaced to the first operating point;
a third step of modification of the operating point of the system during which the operating point is displaced from the first operating point to the second operating point, the modification of the operating point taking place non-adiabatically during the passage of the avoided crossing;
a waiting step at a waiting operating point corresponding to a charge state identical to that of the second operating point during a predefined time, step during which the system transits from the first charge state (1,1) to the charge state corresponding to the second operating point when the two charged particles are in the third spin state T0 and is maintained in the first charge state for the fourth spin state T−;
a third step of measuring the charge state of the system, the spin state of the two particles at the first operating point being the third spin state T0 if the charge state of the system measured is equal to the charge state corresponding to the second operating point and the fourth spin state T− if the charge state of the system measured is equal to the first charge state.

2. The method according to claim 1, wherein the waiting operating point is different from the second operating point, the method comprising, before the waiting step, a step of displacement of the operating point from the second operating point to the waiting operating point.

3. The method according to claim 1, wherein each step of modification of the operating point from the first operating point to the second operating point comprises:
a sub-step of modification from the first operating point to an intermediate operating point, the intermediate operating point corresponding to the first charge state of the system, the avoided crossing formed by the first spin state S and the second spin state T+ being crossed during this sub-step;
a sub-step of modification from the intermediate operating point to the second operating point, the modification taking place non-adiabatically during this sub-step.

4. The method according to claim 1, wherein each step of measuring the charge state is preceded by a step of displacement of the operating point from the second operating point or from the waiting operating point to a fourth operating point corresponding to a charge state identical to the second operating point and having a value of the first parameter $\Gamma$ such that:

$$\Gamma \ll \frac{1}{\tau_{mes}}$$

where $\tau_{mes}$ is the time constant associated with the measurement of the charge state of the system.

5. A quantum device comprising at least two quantum dots and a system configured to implement the method according to claim 1.

6. A non-transitory computer readable data support, on which is recorded a computer programme comprising instructions which, when the programme is executed on a processor lead it to implement the method according to claim 1.

7. A method for determining a fidelity of a measurement of a first spin state noted S of two charged particles being able to adopt said first spin state S, a second spin state noted T+, a third spin state noted T0 and a fourth spin state noted T−, the two charged particles being contained in a system, comprising a first quantum dot and a second quantum dot and characterised by a first parameter $\Gamma$ relative to a potential barrier separating the first and second quantum dots and a second parameter $\varepsilon$ corresponding to a difference in energy between a fundamental state of the first quantum dot and a fundamental state of the second quantum dot, a couple formed by values of the first and second parameters defining an operating point of the system as a function of which the system can adopt a first charge state noted (1,1) wherein each quantum dot contains a charged particle, a second charge state noted (2,0) wherein the first quantum dot contains two charged particles and a third charge state noted (0,2) wherein the second quantum dot contains two charged particles, an operating point of the system being initially in a first operating point corresponding to the first charge state (1,1) of the system and for which the first S, second T+, third T0 and fourth T− spin states are eigenstates of the spin of the two charged particles, the method comprising, for an initial population of spin states wherein the first spin state S is in the majority:
a step of modification of the operating point of the system during which the operating point is displaced from the first operating point to a second operating point corresponding to the second charge state (2,0) or to the third charge state (0,2), the energy level of the first spin state S and the second spin state T+ forming an avoided crossing during the displacement from the first operating point to the second operating point, the modification of the operating point comprising a predetermined number of non-adiabatic transitions back and forth on either side of the avoided crossing;
a step of measuring the charge state of the system;
the steps being repeated from the same population of spin states for a plurality of numbers of transitions back and forth, the fidelity being determined from an evolution of the probability of measurement of a charge state corresponding to the second operating point as a function of the number of transitions back and forth.

8. A method for determining a fidelity of the measurement of a second spin state noted T+ of two charged particles being able to adopt a first spin state S, the second spin state noted T+, a third spin state noted T0 and a fourth spin state noted T−, the two charged particles being contained in a system, comprising a first quantum dot and a second quantum dot and characterised by a first parameter Γ relative to a potential barrier separating the first and second quantum dots and a second parameter ε corresponding to a difference in energy between a fundamental state of the first quantum dot and a fundamental state of the second quantum dot, the couple formed by the values of these two parameters defining an operating point of the system as a function of which the system can adopt a first charge state noted (1,1) wherein each quantum dot contains a charged particle, a second charge state noted (2,0) wherein the first quantum dot contains two charged particles and a third charge state noted (0,2) wherein the second quantum dot contains two charged particles, the operating point of the system being initially in a first operating point corresponding to the first charge state (1,1) of the system and for which the first S, second T+, third T0 and fourth T− spin states are eigenstates of the spin of the two charged particles, the method comprising, for an initial population of spin states wherein the second spin state T+ is in the majority:
- a step of modification of the operating point of the system during which the operating point is displaced from the first operating point to a second operating point corresponding to the second charge state (2,0) or to the third charge state (0,2), the energy level of the first spin state S and the second spin state T+ forming an avoided crossing during the displacement from the first operating point to the second operating point, the modification of the operating point comprising a predetermined number of adiabatic transitions back and forth on either side of the avoided crossing;
- a step of measuring the charge state of the system;

the steps being repeated from the same population of spin states for a plurality of numbers of transitions back and forth, the fidelity being determined from the evolution of the probability of measurement of a charge state corresponding to the second operating point as a function of the number of transitions back and forth.

9. A method for determining a fidelity of the measurement of a third spin state noted T0 of two charged particles being able to adopt a first spin state S, a second spin state noted T+, the third spin state noted T0 and a fourth spin state noted T−, the two charged particles being contained in a system, comprising a first quantum dot and a second quantum dot and characterised by a first parameter Γ relative to the potential barrier separating the first and second quantum dots and a second parameter ε corresponding to the difference in energy between the fundamental state of the first quantum dot and the fundamental state of the second quantum dot, a couple formed by values of the first and second parameters defining an operating point of the system as a function of which the system can adopt a first charge state noted (1,1) wherein each quantum dot contains a charged particle, a second charge state noted (2,0) wherein the first quantum dot contains two charged particles and a third charge state noted (0,2) wherein the second quantum dot contains two charged particles, an operating point of the system being initially in a first operating point corresponding to the first charge state (1,1) of the system and for which the first S, second T+, third T0 and fourth T− spin states are eigenstates of the spin of the two charged particles, the method comprising, for an initial population of spin states wherein the third spin state T0 is in the majority:
- a step of modification of the operating point of the system during which the operating point is displaced from the first operating point to a second operating point corresponding to the second charge state (2,0) or to the third charge state (0,2), the energy level of the first spin state S and the second spin state T+ forming an avoided crossing during the displacement from the first operating point to the second operating point, the modification of the operating point taking place non-adiabatically during the passage of the avoided crossing;
- a waiting step at a waiting operating point corresponding to a charge state identical to that of the second operating point during a predefined time;
- a step of measuring the charge state of the system;

the steps being repeated from the same population of spin states for a plurality of predefined waiting times, the fidelity being determined from the evolution of the probability of measurement of a charge state corresponding to the second operating point as a function of the waiting times.

* * * * *